(12) United States Patent
Dey et al.

(10) Patent No.: US 9,223,854 B2
(45) Date of Patent: Dec. 29, 2015

(54) DOCUMENT RELEVANCE DETERMINING METHOD AND COMPUTER PROGRAM

(75) Inventors: Prasenjit Dey, Karnataka (IN); Krishnan Ramanathan, Karnataka (IN); Sriganesh Madhvanath, Karnataka (IN); Praphul Chandra, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1376 days.

(21) Appl. No.: 12/642,876

(22) Filed: Dec. 21, 2009

(65) Prior Publication Data

US 2011/0087659 A1    Apr. 14, 2011

(30) Foreign Application Priority Data

Oct. 14, 2009  (IN) ............................ 2495/CHE/2009

(51) Int. Cl.
*G06F 17/30* (2006.01)

(52) U.S. Cl.
CPC .... *G06F 17/30696* (2013.01); *G06F 17/30663* (2013.01)

(58) Field of Classification Search
None
See application file for complete search history.

(56) References Cited

U.S. PATENT DOCUMENTS

| 6,067,565 | A  * | 5/2000  | Horvitz ......................... 709/218 |
| 6,577,329 | B1 * | 6/2003  | Flickner et al. ............... 715/774 |
| 6,601,021 | B2 * | 7/2003  | Card et al. ..................... 702/187 |
| 6,608,615 | B1 * | 8/2003  | Martins ......................... 345/156 |
| 7,047,242 | B1 * | 5/2006  | Ponte ................. G06F 17/30864 |
| 7,593,602 | B2 * | 9/2009  | Stentiford ..................... 382/305 |
| 7,881,493 | B1 * | 2/2011  | Edwards et al. .............. 382/103 |
| 2002/0016787 | A1 * | 2/2002 | Kanno ................ G06F 17/3061 |
| 2002/0099700 | A1 * | 7/2002 | Li ..................... G06F 17/30864 |
| 2004/0103111 | A1 * | 5/2004 | Miller et al. ................... 707/102 |
| 2007/0118518 | A1 * | 5/2007 | Wu ................... G06F 17/30719 |
| 2007/0185858 | A1 * | 8/2007 | Lu ..................... G06F 17/30864 |
| 2009/0254543 | A1 * | 10/2009 | Ber .................. G06F 17/30675 |
| 2011/0264699 | A1 * | 10/2011 | Antonelli .......... G06F 17/30707 707/777 |

OTHER PUBLICATIONS

Anthony Nguyen et al., "Gaze tracking for region of interest coding in JPEG 2000", Signal Processing: Image Communication, Jun. 2006, vol. 21, Issue 5, pp. 359-377.
Darryl Greig et al., "Audience Measurement for Pricing Digital Signage", HP TechCon 2007.
Georg Busher et al., "Query Expansion Using Gaze-Based Feedback on the Subdocument Level", SIGIR; Jul. 20-24, 2008. ACM, New York, pp. 387-394.
Anthony Nguyen et al., "Visual attention based ROI maps from gaze tracking data", International Conference on image Processing, ICIP 2004, vol. 5, Oct. 24-27, 2004,p. 3495-3498.

* cited by examiner

*Primary Examiner* — Polina Peach
(74) *Attorney, Agent, or Firm* — Mannava & Kang, P.C.

(57) ABSTRACT

Disclosed is a method and computer program product of determining the relevance of at least a part of an electronic document comprising a plurality of terms distributed over a plurality of regions of said document, comprising displaying the electronic document to a user; determining the gaze characteristics of the person on a region of the electronic document; assigning a relevance score to an individual term in said region based on said characteristics; and generating a term relevance label for said electronic document, said term relevance label comprising relevance scores for the respective individual terms in said document The relevance scores may also be used to define a user profile for the user that can aid in retrieving future documents of relevance to the user.

2 Claims, 5 Drawing Sheets

DOCUMENT RELEVANCE DETERMINING METHOD AND COMPUTER PROGRAM

RELATED APPLICATIONS

Benefit is claimed under 35 U.S.C. 119(a)-(d) to Foreign application Serial No. 2495/CHE/2009 entitled "DOCUMENT RELEVANCE DETERMINING METHOD AND COMPUTER PROGRAM" by Hewlett-Packard Development Company, L.P., filed on 14th Oct. 2009, which is herein incorporated in its entirety by reference for all purposes.

BACKGROUND OF THE INVENTION

Nowadays, information retrieval from electronic documents is fundamental to the functioning of our society. Such information retrieval may be performed on a set of documents, e.g. an electronic database, with such a set being stored in a centralized manner, e.g. on a personal computer or on a private network, or stored in a distributed manner, e.g. on a virtual private network having nodes in different geographical locations or on publicly accessible networks such as the Internet.

Often, the extremely large number of available electronic documents makes it difficult to retrieve the desired information in an efficient manner. To this end, attempts have been made to determine the relevance of electronic documents based on their information content such that automated information retrieval processes return the electronic documents that are most likely to contain information relevant to the information retrieval process.

An electronic document typically comprises a plurality of pieces (units) of information, which are also referred to as 'terms'. The classical method of indexing and retrieval of electronic documents uses the notion of assigning a weight $w_k$ to a term k to characterize an electronic document, which weight is directly proportional to the frequency of the term (TF) in the electronic document and inversely proportional to the frequency of the documents (IDF) in which the term occurs; $w_k \sim TF/IDF$. This method relies on indexing all the terms, e.g. words, of the electronic document irrespective of whether they are core to the document content or are peripheral in nature. Consequently, information retrieval algorithms utilizing the assigned weights $w_k$ in respective electronic documents do not necessarily return a set of electronic documents that are relevant to the search query defined by a user.

Information retrieval processes may also utilize a user profile that defines the interest of the user to retrieve a set of electronic documents from a database that are most likely to be of interest to the user. For example, the Rocchio algorithm analyses electronic documents that have been accessed by the user and assumes the accessed documents to be relevant, and weights high frequency terms in relevant electronic documents positively and high frequency terms in irrelevant electronic documents, i.e. non-accessed documents, negatively.

However, the actual interests of a user may be confined to only a small part of the electronic document that he/she is interested in, which is core to the document, rather than being interested in everything in the document. Hence, even a low TF term may be critical to the electronic document from an information retrieval perspective. Thus a personalized search/information retrieval application based on a user profile constructed using only high TF terms may return a significant number of irrelevant results.

BRIEF DESCRIPTION OF THE EMBODIMENTS

Embodiments of the invention are described in more detail and by way of non-limiting examples with reference to the accompanying drawings, wherein FIG. 1 schematically depicts two documents having the same term in different contexts;

FIG. 2 schematically depicts the gaze intensity of a user on regions of the documents of FIG. 1;

Figure 6:
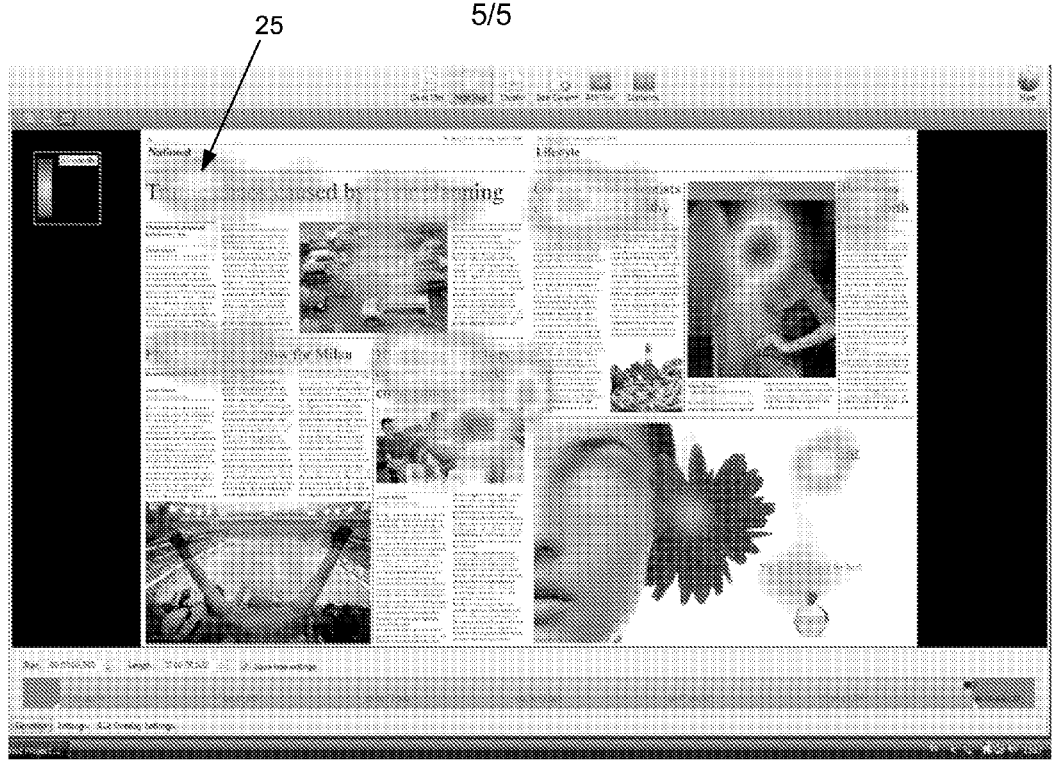
Figure 7:
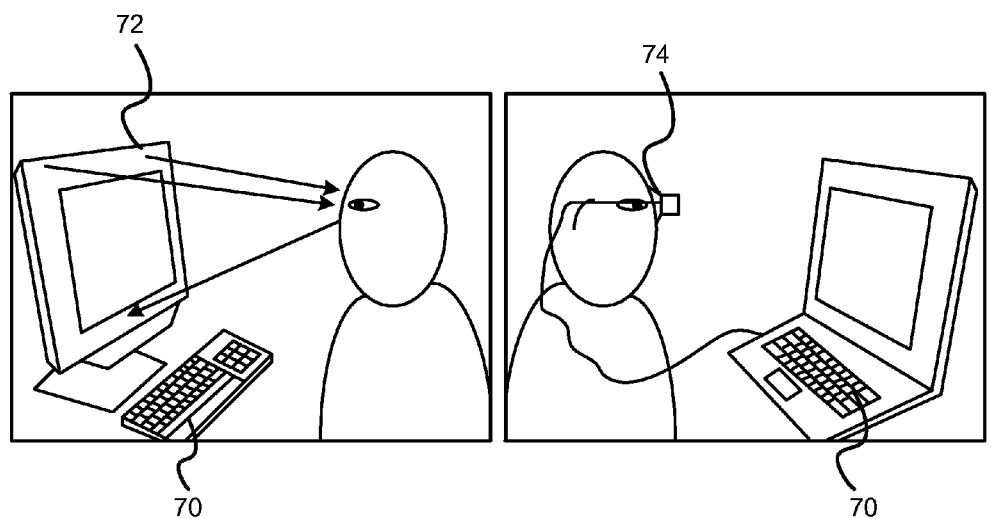

FIG. 6 schematically depicts a displayed document with gaze intensities on regions of the document; and FIG. 7 depicts example embodiments of a computer system of the present invention.

DETAILED DESCRIPTION OF THE DRAWINGS

It should be understood that the Figures are merely schematic and are not drawn to scale. It should also be understood that the same reference numerals are used throughout the Figures to indicate the same or similar parts.

Figure 1:
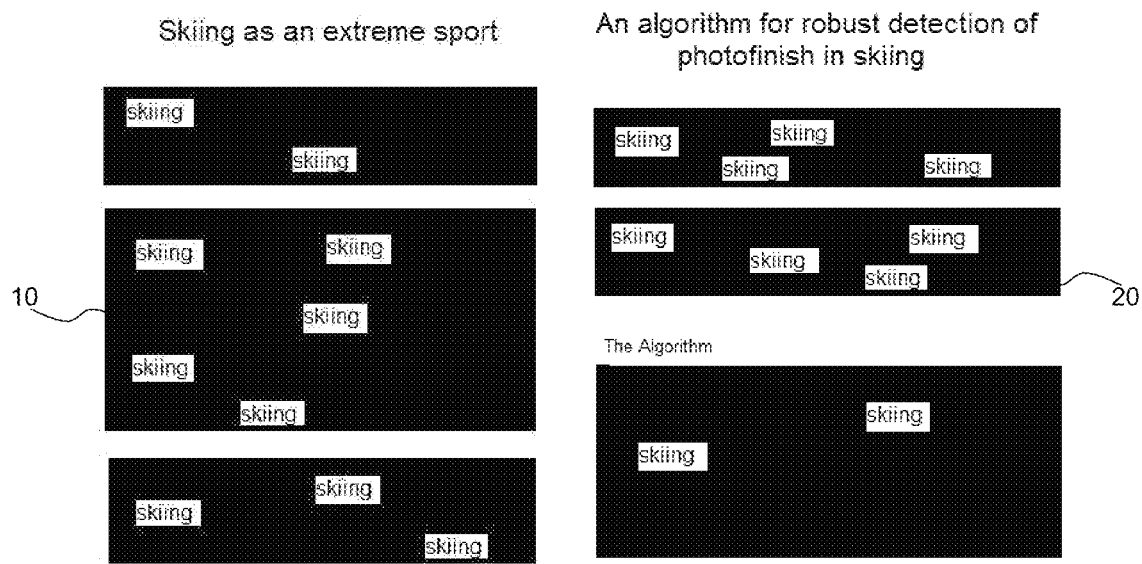

FIG. 1 depicts an example of two documents 10 and 20 in which the term 'skiing' appears the same number of times, but in a totally different context. In document 10, the term 'skiing' is core to the document, whereas in document 20, the term 'skiing' is much more of subordinate importance. Despite this, state of the art methods for assessing the relevance of these documents, i.e. methods solely relying on the TF and IDF parameters to assess this relevance, would return an equal relevance score for both documents in response to a search query for the term 'skiing'. This obviously is an unwanted situation.

Figure 2:
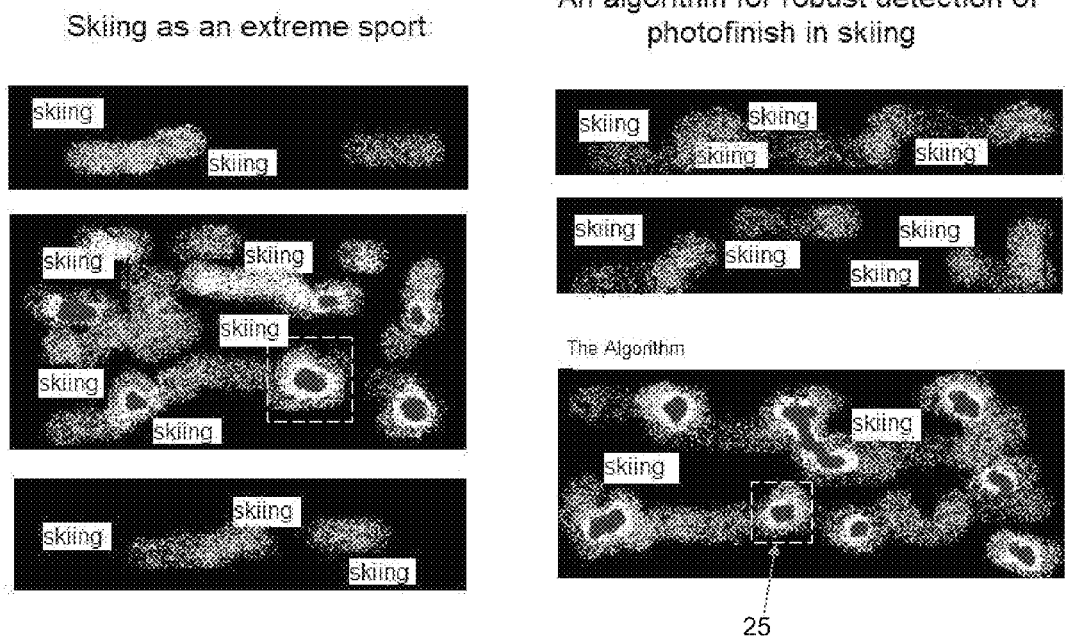

FIG. 2 schematically depicts the principle that underlies at least some embodiments of the present invention. This principle is based on the recognition that human readers of electronic documents typically focus more often and longer on parts of the documents of interest to them, whereas less relevant parts of the documents are skimmed over. Such focusing will be referred to as 'gaze' in the remainder of the description. FIG. 2 depicts the gaze intensities 25 of a human reader on different regions of the documents 10 and 20 respectively. Some higher intensities are marked by a dashed box for the sake of clarity. As will be apparent from FIG. 2, the higher gaze intensities in document 10 are located around the occurrences of the term 'skiing' whereas in document 20 this does not appear to be the case. Instead, for document 20 the most profound gaze intensities 25 appear to coincide with different terms in the document that have not been explicitly shown.

Hence, it will be clear from FIG. 2 that the location of the gaze intensities or more precisely, the overlap between the more profound gaze intensities and certain terms in an electronic document can be used to determine what a human reader perceives as relevant information in the document.

At least some embodiments of the present invention are based on the insight that different readers of the same electronic document tend to exhibit significant overlap in what these readers perceive to be core information in the document. In other words, different readers of the same electronic document tend to largely focus on the same regions of interest.

Hence, it has been recognized that labeling electronic documents that are available for retrieval in some search query with such relevance information will greatly improve the percentage of relevant documents retrieved in such a query. Non-limiting examples of such electronic documents include electronic documents stored on computer systems, e.g. in central or distributed databases, and electronic documents that may be retrieved through the Internet. Moreover, it is not necessary to assess the whole electronic document for its relevance but merely the relevance information associated with the electronic document such that such search queries can be performed in a more efficient manner.

Figure 3:
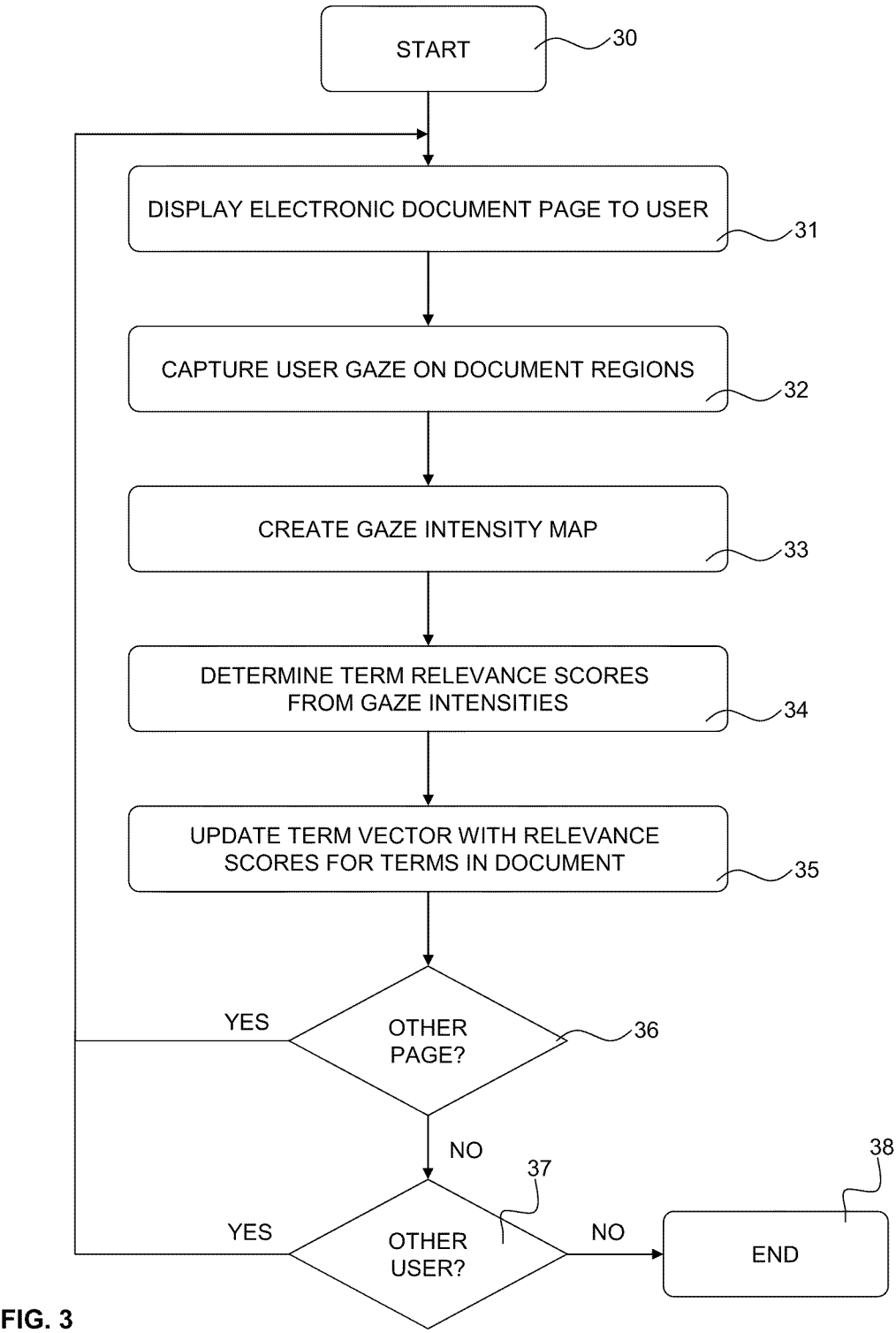
FIG. 3 depicts a flow chart of an embodiment of a method of the present invention.

A non-limiting example of an embodiment of an electronic document ranking method of the present invention is shown in the flow chart of FIG. 3. The method starts in step 30, after which an electronic document is displayed to a user (reader) in step 31. The electronic document may be displayed on any suitable display, e.g. a display attached to a personal computer, a laptop screen and so on. In an embodiment, the desktop or laptop PC captures the gaze locations of the user on the display with the help of a gaze detection device. This is shown as step 32. The gaze detection device may be worn by the user or may be integrated as one or more cameras in the PC. The PC may further comprise appropriate image processing software to process the detected gaze. Such arrangements are known per se and will not be discussed in further detail for reasons of brevity only.

In a next step 33, an intensity map is created from the gaze data, e.g. gaze locations, collected by the gaze detection device. At this point, it is noted that the gaze data typically comprises a combination of rapid eye movements between multiple regions on the displayed document page, so-called saccades, and eye fixations on or around single regions on the displayed document page. Saccades are known to be an indication of limited interest of a reader into a topic or term displayed in these multiple regions. For this reason, in an embodiment, saccades are ignored in the creation of the gaze intensity map. This may for instance be realized by the gaze tracking device deleting the recorded saccades.

In an embodiment, both the gaze frequency, i.e. the number of times a human reader focuses on the same region of the electronic document and the gaze duration are taken into consideration when constructing the gaze intensity map. It has been found that this improves the accuracy of the relevance score assigned to a particular term residing in such a region. Alternative embodiments include the use of either the gaze frequency or the gaze duration only to reduce the complexity of the ranking process at the expense of decreased accuracy.

The gaze intensity map is used to derive relevance scores for the various terms in the electronic document in step 34. A non-limiting example of such a derivation is described in more detail below.

The gaze intensity map on the page may be defined as G(i,j) where i and j are row and column pixel locations on the page of the electronic document. For the electronic document, the positions of the terms on the display can be inferred using many known existing techniques. Hence, the respective location of the various terms on the displayed document page can be correlated to the intensity map G(i,j), e.g. by overlaying the intensity map with a term location map constructed from the sets of pixel locations. Consequently, a term intensity map $L_n$ may be constructed that represents the gaze intensity for each term n on the displayed page.

As will be apparent from e.g. FIG. 1, many terms ('skiing') will appear multiple times in an electronic document. In an embodiment, the term intensity map $L_n$, in which each instance of such a term has a separate entry, may be converted into a further term intensity map $T_k$ in which each term occurs only once. This may for instance be achieved by summing the different instances of the same term in term intensity map $L_n$.

At this point, it is stipulated that the term 'map' in this application is not be construed to be limited to 2-dimensional representations that correspond to the layout of the displayed page of the electronic document. Any suitable representation, e.g. in the form of a matrix, spreadsheet or a table may be chosen, as long as the mapping of the gaze intensities to respective regions of the displayed page is at least implicitly incorporated in the chosen representation.

In step 35, the electronic document is labelled with the calculated term relevance information, which in a preferred embodiment is implemented in the form of a term vector. However, it is pointed out that any suitable representation of the term relevance information may be chosen.

The term relevance labelling may be implemented in any suitable manner. For instance, a term vector may be incorporated into the electronic document, e.g. in the form of metadata. Alternatively, a table of relevance information units, e.g. different term vectors may be provided, with each table entry comprising a pointer or the like to an electronic document stored in a different physical location. The latter implementation may be advantageous when searching (centralized) databases because it does not require evaluation of each individual document, thus greatly improving the efficiency of the search process.

In an embodiment, the weight $v_k$ of the distinct term k in the term vector is proportional to $T_k$ and TF and inversely proportional to IDF, e.g.

$$v_k \alpha T_k * TF/IDF$$

The weighting factor, $v_k$ will be zero if a term has not been gazed upon even if the term k appears multiple times in the document. The term vector of the document may be represented in the form:

$$\text{Term\_vector\_document} = [\ldots v_i, \ldots, v_k, \ldots]$$

At this point, it is noted that in the context of the present invention, a 'term' does not have to be a single word or phrase. A term may be any unit of information in the electronic document, such as an article in an electronic newspaper displaying multiple articles on a single page or a distinct segment of the electronic document.

For instance, in an alternative embodiment, the intensity map $T_k$ may be constructed for document segments. In the case of HTML or XML pages, this may involve mapping the pixel location to the document sub-section in the Document Object Model (DOM). The teachings of the present invention may even be extended to electronic documents containing images. For document images, image segmentation techniques may be overlaid with the gaze intensity map to detect which document segment the user is focusing on.

At this point, it is noted that in an alternative embodiment, the term relevance scores may be based on the combination of determined gaze intensities and user body language such as facial expressions or recognized gestures made by the user, e.g. a user smiling, frowning or making certain gestures such as thumbs up, pointing and so on to indicate relevance of a particular region of interest onto which he is focusing his gaze. Body language recognition such as facial expression recognition and gesture recognition is known per se and will not be explained in further detail for the sake of brevity only. This embodiment is particularly advantageous in cases where the gaze intensity map is noisy, such that the addition of gesture recognition can be used to improve the detection resolution of interesting document segments (terms), this multimodal interaction can improve the signal to noise ratio of the gaze intensity map.

In case an electronic document comprises multiple pages, the step 31-35 may be repeated for each page of the electronic document, as depicted in step 36. It is pointed out that in the context of the present application, the meaning of the term 'page' includes the area of an electronic document that can be depicted on the display. In other words, the amount of information (terms) per page can differ when the zoom factor of the document displayed on the display device is altered. In case of a multiple page electronic document, step 35, i.e. the creation of a relevance information label for the electronic document may comprise summing the gaze intensity maps for each page to compute a term intensity map $T_k$ for a distinct term k occurring across pages.

As already explained, one of the insights on which the present invention has been based is that different users of the electronic document will largely find the same terms in an electronic document of relevance. Hence, a more reliable document ranking may be achieved by combining the calculated term relevance scores for different users into a single term relevance label such as a term relevance vector. In an embodiment, the method depicted in FIG. 3 therefore further comprises step 37 in which steps 31-36 are repeated for each new user before terminating the method in step 38, with the term weights $v_k$ in the term relevance label such as a term vector being cumulatively modified, e.g. by averaging the relevance scores of different users for each term.

Combination of relevance information from different users may have the following characteristics. In case the gaze distribution profile of different users on the document are similar, combination of the individual gaze intensities may lead to a particular region of interest being identified in the term relevance label. Hence, the resulting probability distribution of the gaze on the document, across users, is non-uniform, it indicates particular regions of interest where the distribution has high values across users, such that the electronic document is appropriately indexed with higher weights to those terms in the regions of interest. The hit-rate of relevant electronic documents labelled in this manner in e.g. a web-based search is expected to outperform conventional methods that rely on using the classical TF, IDF framework.

On the other hand, if the gaze distribution profile of different users on the document is not similar, combination of the individual gaze intensities may lead to a large number of region of interest being identified in the term relevance label. The resulting probability distribution of the gaze on the document is approximately uniform and thus almost all terms have equal weights and the retrieval performance will be similar to what would be obtained using the conventional framework.

In another embodiment of the proposed method, the gaze map of the terms $T_k$ may be used to index a user profile. The terms in the region with higher gaze intensity is give higher weight than terms in the region with lower gaze intensity. This will result in the user profile having higher weights of terms that the user is actually interested in and has spent more time on reading them. For example, this can help refine a query like 'skiing in Alaska', where one can know from the user profile whether the user had spent more time gazing at parts of documents with 'skiing' terms, such that this query is more about 'skiing' and less about 'Alaska'.

Figure 4:
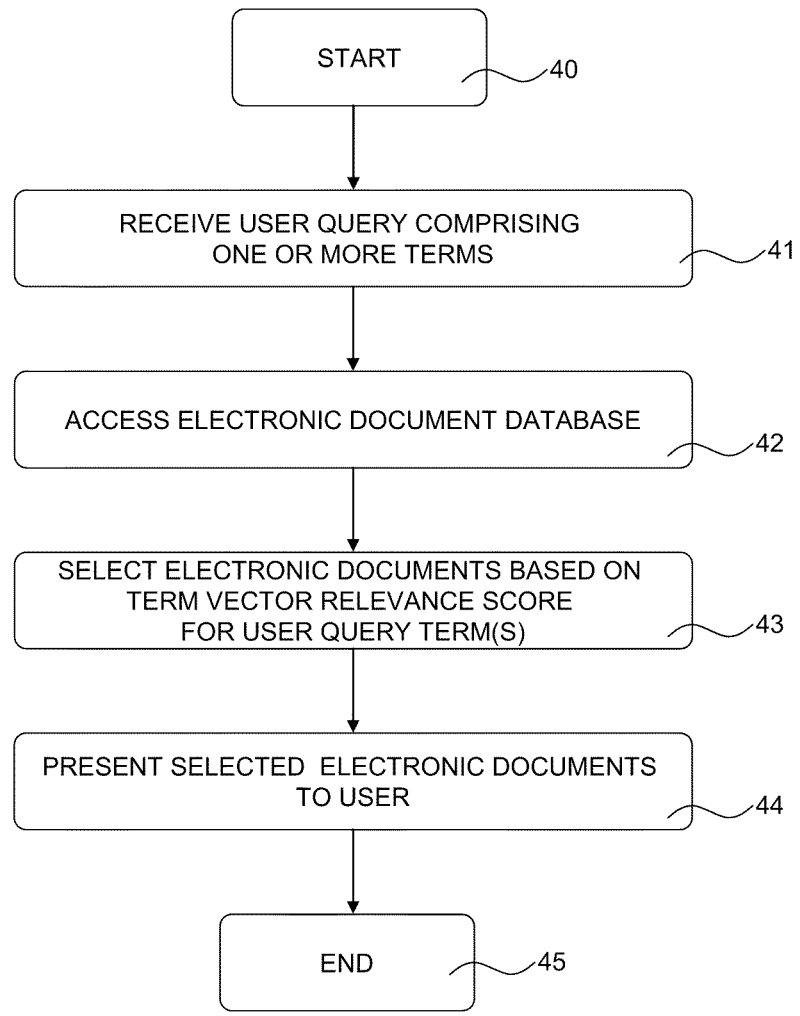
FIG. 4 depicts a flow chart of an embodiment of another method of the present invention.

A non-limiting example of an electronic document retrieval method in accordance with an aspect of the present invention is shown in the flow chart of FIG. 4. The method starts in step 40, after which a user-defined search query is received in step 41. Such a query may be defined in any suitable manner, e.g. by typing key terms into a dialog box of a browser application on a computer. In step 42, an electronic document database is accessed to run the query. This may be any suitable database, e.g. a collection of electronic documents on a personal computer, a cluster of servers of a local area network, the Internet and so on. At least some of the electronic documents in the electronic database are labelled with a term relevance label as previously explained.

In step 43, the respective term relevance labels are accessed to determine the relevance score of the term(s) defined in the user-defined search query, and electronic documents for which a sufficiently high term relevance score has been found are selected for presentation to the user. Optionally, this step may be preceded by checking if the term is present in the corresponding electronic document. This may for instance be useful for databases in which the electronic documents are not categorized. In step 44, the electronic documents selected in step 43 are presented to the user, e.g. by displaying them on the display of a computer, after which the method is terminated in step 45. The presentation of the selected electronic documents may take any suitable form, such as in the form of (hyper)links to the actual electronic documents.

Figure 5:
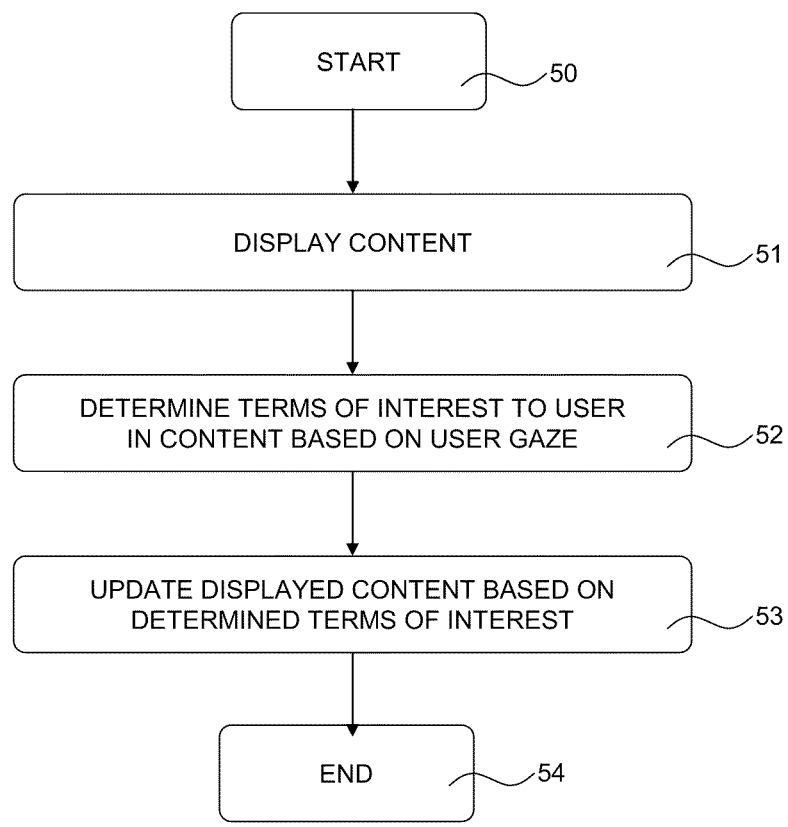
FIG. 5 depicts a flow chart of an embodiment of yet another method of the present invention.

A non-limiting example of a method in accordance with yet another aspect of the present invention is shown in the flow chart of FIG. 5. This embodiment is based on the recognition that in scenarios where a user is provided with a plurality of electronic documents or with an electronic document comprising multiple regions wherein the content of at least some of these regions is periodically updated, the determination of the terms most relevant to the user as previously discussed may be used to improve the relevance of the content provided to the user. This is for instance of potential interest in the field of advertising, where a user may be presented with advertisements of particular interest to the user once these interests have been determined as previously discussed.

The method starts in step 50, after which the user is presented with an electronic document containing various contents in step 51, e.g. by displaying the electronic document on a screen or display. In step 52, the content of interest to the user is determined as previously discussed, after which the electronic document is updated in part of completely in step 53 by providing the user with additional content of interest as determined in step 52. For instance, in case of a user focussing on the RAM specifications of a computer advertisement, subsequent computer advertisements for computers having large amounts of RAM may be displayed to the user.

Alternatively, in an electronic news paper as shown in FIG. 6, the determined topics of interest from gaze intensities 25 may be used to replace topics of lesser interest to the user with topics of greater interest, such that the reader of the newspaper is confronted with an electronic newspaper having an improving level of relevant content.

Each of the various methods of the present invention may be captured in a computer program product for execution on a suitable computer system. To this end, the various steps of these methods may be incorporated in the computer program product by means of suitable algorithms. Since the implementation of these method steps in computer code requires routine skill only, this implementation will not be discussed in further detail for reasons of brevity only. The computer program product may be stored on any suitable computer-readable medium, e.g. CD-ROM, DVD, USB memory device or on a computer-accessible data storage device such as the hard disk of an Internet-accessible host computer.

In accordance with another aspect of the present invention, a computer system may be provided including the aforementioned computer program product. Non-limiting examples of such computer systems are shown in FIG. 7. The computer system typically comprises a computer 70 and a gaze detection device, which may be integrated into the computer by one or more cameras 72 or may be an external device 74. The computer 70 typically comprises a processor for executing the aforementioned computer program product.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of retrieving at least one electronic document from a database comprising a plurality of electronic documents ranked, the method comprising:
   displaying the electronic document to a user;
   determining the gaze characteristics of the person on a region of the electronic document;
   assigning a relevance score to an individual term in said region based on said characteristics; and
   generating a term relevance label for said electronic document, said term relevance label comprising relevance scores for the respective individual terms in said document;
   receiving a user-defined search query including at least one individual term;
   accessing the electronic database;
   accessing the term relevance label of the respective electronic documents
   to retrieve the respective relevance scores of the at least one individual term in the search query for said documents,
   selecting the electronic documents from said electronic database for which the relevance score of the at least one individual term in the search query meets a predefined criterion; and
   displaying said selection of electronic documents to the user.

2. The method of claim 1, wherein the database comprises the Internet.

* * * * *